United States Patent
Park et al.

(10) Patent No.: US 11,640,263 B2
(45) Date of Patent: May 2, 2023

(54) MEMORY SYSTEM AND OPERATING METHOD THEREOF

(71) Applicant: SK hynix Inc., Icheon-si (KR)

(72) Inventors: Su Ik Park, Icheon-si (KR); Ku Ik Kwon, Icheon-si (KR); Kyeong Seok Kim, Icheon-si (KR); Yong Joon Joo, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/191,207

(22) Filed: Mar. 3, 2021

(65) Prior Publication Data
US 2022/0107759 A1 Apr. 7, 2022

(30) Foreign Application Priority Data
Oct. 7, 2020 (KR) .......................... 10-2020-0129378

(51) Int. Cl.
*G06F 3/06* (2006.01)
*G06F 9/48* (2006.01)

(52) U.S. Cl.
CPC .......... *G06F 3/0659* (2013.01); *G06F 3/0604* (2013.01); *G06F 3/0673* (2013.01); *G06F 9/4843* (2013.01)

(58) Field of Classification Search
CPC .... G06F 3/0659; G06F 3/0604; G06F 3/0673; G06F 9/4843
See application file for complete search history.

(56) References Cited

U.S. PATENT DOCUMENTS

| | | | |
|---|---|---|---|
| 2011/0219382 A1* | 9/2011 | Hou ......................... | G06F 9/50 718/104 |
| 2015/0006938 A1* | 1/2015 | Jahagirdar ............ | G06F 9/4418 713/324 |
| 2015/0081980 A1* | 3/2015 | Walker ................ | G06F 12/0802 711/135 |
| 2015/0082317 A1* | 3/2015 | You ....................... | G06F 9/5094 718/104 |
| 2016/0127604 A1* | 5/2016 | Kawano ............ | H04N 1/32475 358/1.15 |
| 2021/0294522 A1* | 9/2021 | Ish .......................... | G06F 3/061 |

FOREIGN PATENT DOCUMENTS

| | | | | |
|---|---|---|---|---|
| CN | 111913669 A | * | 11/2020 | .......... G06F 3/0607 |
| CN | 112418389 | * | 2/2021 | |
| JP | 2007018268 | * | 1/2007 | |
| KR | 10-2018-0093199 A | | 8/2018 | |
| KR | 20180093199 | * | 8/2018 | |

\* cited by examiner

*Primary Examiner* — Ryan Bertram
(74) *Attorney, Agent, or Firm* — Weaver Anstin Villenenve & Sampson LLP

(57) ABSTRACT

Embodiments of the present disclosure relate to a memory system and an operating method thereof. According to the embodiments of the present disclosure, the memory system may include a plurality of cores, a control core, and a shared memory. When processing the event, the control core may select a first core executing a target job requiring distributed execution among the plurality of cores, and the first core may run a first firmware among the plurality of firmwares to execute the target job. The control core may select a second core to execute the target job together with the first core, and may control the second core to run the first firmware. The control core may control the first core and the second core to perform distributed execution of the target job.

14 Claims, 15 Drawing Sheets

MEMORY SYSTEM AND OPERATING METHOD THEREOF

CROSS-REFERENCE TO RELATED APPLICATION

The present application claims priority under 35 U.S.C. 119(a) to Korean patent application number 10-2020-0129378 filed on Oct. 7, 2020, which is incorporated herein by reference in its entirety.

BACKGROUND

1. Technical Field

The embodiments relate to a memory system and an operating method thereof.

2. Related Art

A memory system, e.g., a storage device, stores data on the basis of a request from a host, such as a computer, a mobile terminal (for example, a smartphone or a tablet), or any of various other electronic devices. The memory system may be a type of device that stores data in a magnetic disk such as a hard disk drive (HDD), or a type of device that stores data in a nonvolatile memory such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute or control operations for reading, writing, or erasing data in a volatile memory or a nonvolatile memory included in the memory system. The memory controller may run firmware for performing a logical operation for controlling such operations.

The memory system may monitor whether an event to be processed by the memory system has occurred. When an event occurs, the memory system can execute one or more jobs or tasks to process the event. In this case, if the completion time of any one of the executed jobs is delayed, the event processing completion time of the memory system may also be delayed.

SUMMARY

Embodiments of the disclosure provide a memory system and an operating method thereof capable of improving the response speed to the host by preventing the problem that the event processing is delayed due to the delay in the completion of a specific job.

In one aspect, embodiments of the disclosure provide a memory system including a memory device, and a memory controller for communicating with the memory device and controlling the memory device.

The memory controller may include a plurality of cores.

The memory controller may include a control core for monitoring an event to be processed using the plurality of cores, and controlling the plurality of cores to process the event.

The memory controller may include a shared memory for storing state information of the plurality of cores, state information of one or more jobs executed by the plurality of cores to process the event, and a plurality of firmwares run by the plurality of cores to execute any one of the jobs.

The control core, when processing the event, may select a first core executing a target job requiring distributed execution among the plurality of cores—the first core runs a first firmware among the plurality of firmwares to execute the target job.

The control core may select a second core among the plurality of cores to execute a part of the target job together with the first core.

The control core may control the second core to run the first firmware.

The control core may control the first core and the second core to perform distributed execution of the target job.

The first core may divide the target job into a plurality of sub-jobs independently executable in different cores.

The first core may store information of a first sub-job to be executed by the first core among the plurality of sub-jobs and information of a second sub-job to be executed by the second core in the shared memory.

The second core may execute the second sub-job based on the information of the second sub-job stored in the shared memory, and stores execution result of the second sub-job in the shared memory.

In another aspect, embodiments of the disclosure provide an operating method of a memory system.

The operating method of the memory system may comprise monitoring an event to be processed using a plurality of cores.

The operating method of the memory system may comprise selecting, when processing the event, a first core executing a target job requiring distributed execution among one or more jobs executed to process the event among the plurality of cores—the first core runs a first firmware among a plurality of firmwares run by the plurality of cores to execute any one of the jobs.

The operating method of the memory system may comprise selecting a second core among the plurality of cores to execute a part of the target job together with the first core.

The operating method of the memory system may comprise controlling the second core to run the first firmware.

The operating method of the memory system may comprise controlling the first core and the second core to perform distributed execution of the target job.

The step for controlling to perform distributed execution of the target job may comprise dividing the target job into a plurality of sub-jobs independently executable in different cores.

The operating method of the memory system may further comprise the first core storing information of a first sub-job to be executed by the first core among the plurality of sub-jobs and information of a second sub-job to be executed by the second core in the shared memory.

The operating method of the memory system may further comprise the second core executing the second sub-job based on the information of the second sub-job stored in the shared memory, and stores execution result of the second sub-job in the shared memory.

The operating method of the memory system may further comprise controlling the second core to run a second firmware among the plurality of firmwares after execution of the target job is completed.

In another aspect, embodiments of the disclosure provide a memory system including a memory device, and a memory controller for communicating with the memory device and controlling the memory device. The memory controller is configured to monitor an event to be processed using a plurality of cores and select, when processing the event, a first core executing a target job requiring distributed execution among one or more jobs executed to process the event among the plurality of cores based on state information of the plurality of cores and state information of jobs, wherein the first core runs a first firmware among a plurality of firmwares run by the plurality of cores to execute any one of the jobs. The memory controller is also configured to select a second core among the plurality of cores to execute a part of the target job together with the first core. The memory controller is further configured to control the second core to run the first firmware, and to control the first core and the second core to perform distributed execution of the target job.

The memory controller can also be configured to select, as the first core, a core having the longest expected execution time of the job to be executed among the plurality of cores.

The memory controller can also be configured to select a core in an idle state among the plurality of cores as the second core.

The memory controller can also be configured to divide the target job into a plurality of sub-jobs independently executable in different cores.

The memory controller can also be configured to store information of a first sub-job to be executed by the first core among the plurality of sub-jobs and information of a second sub-job to be executed by the second core in the shared memory.

The memory controller can also be configured to control the second core to run a second firmware among the plurality of firmwares after execution of the target job is completed.

According to the embodiments of the disclosure, it is possible to improve the response speed to the host by preventing the problem that the event processing is delayed due to the delay in the completion of a specific job.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
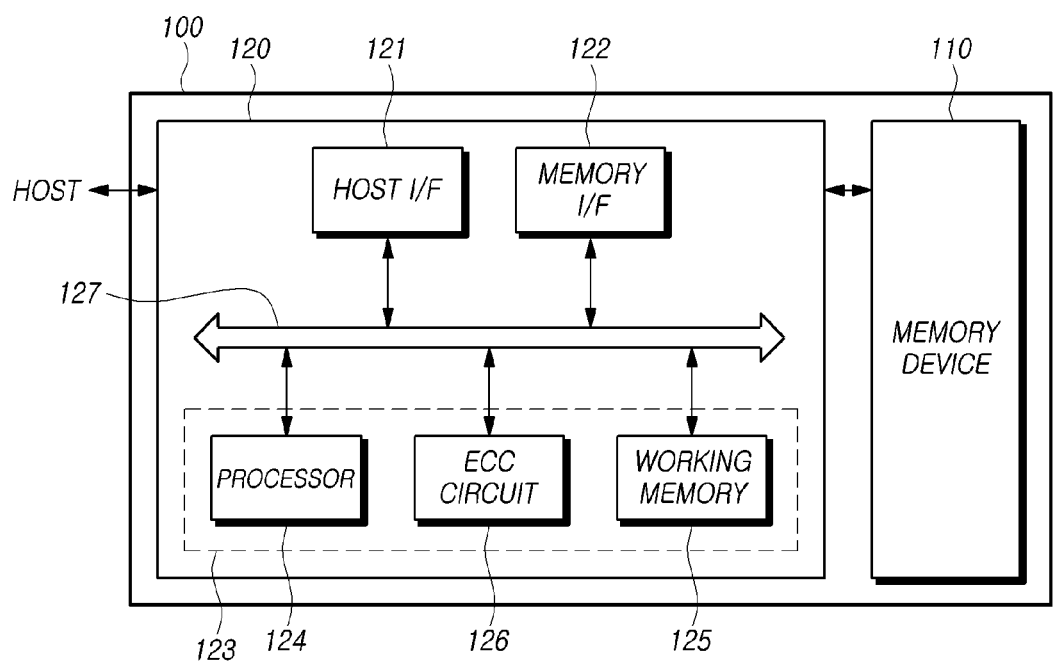
FIG. 1 is a schematic diagram illustrating a configuration of a memory system according to an exemplary embodiment of the present disclosure.

FIG. 1 is a diagram illustrating the schematic configuration of a memory system 100 based on an exemplary embodiment of the disclosed technology.

In some implementations, the memory system 100 may include a memory device 110 configured to store data, and a memory controller 120 configured to control the memory device 110.

The memory device 110 may include multiple memory blocks each including a predetermined number of memory cells for storing data. The memory device 110 may be configured to operate in response to control signals received from the memory controller 120. Operations of the memory device 110 may include, for example, a read operation, a program operation (also referred to as a "write operation"), and an erase operation.

The memory cells in the memory device 110 are used to store data and may be arranged in a memory cell array. In some implementations where the memory device 110 is a flash memory device, the memory cell array may be divided into memory blocks of memory cells and each block includes different pages of memory cells. In some implementations of NAND flash memory devices, a page of cells is the smallest memory unit that can be programmed (or written) and read, and the data stored in memory cells can be erased at the block level.

In some implementations, the memory device 110 may be implemented as various types, such as a double data rate synchronous dynamic random access memory (DDR SDRAM), a low power double data rate fourth generation (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementations, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area in the memory device having a physical address corresponding to the received address from the controller.

In some implementations, the memory device 110 may perform, among others, a program operation, a read operation, and an erase operation. During the program operation, the memory device may write ("program") data to the area selected by the address. During the read operation, the memory device 110 may read data from a memory area selected by the address. During the erase operation, the memory device 110 may erase data stored in a memory area selected by the address.

The memory controller 120 may control write (program), read, erasure, and background operations to be performed on the memory device 110. The background operation may include operations that are implemented to optimize the overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such a background operation of the memory device.

The memory controller 120 and the host may be separate devices. In some implementations, the memory controller and the host may be integrated in a single device. In the following description, as an example, the memory controller 120 and the host are separate devices.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly coupled to the memory device 110 to provide an interface for communication with the memory device 110. That is, the memory interface 122 may be configured to provide the memory device 110 and the memory controller 120 with an interface for the memory controller 120 to perform memory operations on the memory device based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to run a flash translation layer (FTL) to effectively manage the memory operations on the memory system 100. For example, the processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM), or any other type of suitable volatile memory.

The error detection/correction circuit (ECC) 126 may be configured to detect and correct one or more erroneous bits in the data by using an error detection and correction code.

In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. As used herein, a "sector" may refer to a data unit that is smaller than the smallest unit for read operations (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability on a sector by sector basis. For example, if the BER is higher than a reference value, the error detection/correction circuit 126 may determine that the erroneous bits in the corresponding sector are uncorrectable and the corresponding sector is marked "fail." If the BER is lower than the reference value, the error detection/correction circuit 126 may determine that the corresponding sector is correctable and the corresponding sector can be marked "pass."

The error detection/correction circuit 126 may perform error detection and correction operations successively on all read data. When a sector included in the read data is correctable, the error detection/correction circuit 126 may go on to the next sector to check as to whether an error correction operation is needed on the next sector. Upon completion of the error detection and correction operations on all the read data in this manner, the error detection/correction circuit 126 may identify which sector is deemed uncorrectable in the read data. The error detection/correction circuit may provide information (e.g., address of uncorrectable sector) regarding the sectors deemed uncorrectable to the processor 124.

The memory system 100 may also include a bus 127 to provide a channel between the constituent elements 121, 122, 124, 125, and 126 of the memory controller 120. The bus 127 may include, for example, a portion that forms a control bus for delivering various types of control signals and commands, and a portion that forms a data bus for delivering various types of data.

The above-mentioned constituent elements 121, 122, 124, 125, and 126 of the memory controller 120 are illustrated in FIG. by way of example. It is noted that some of the above-mentioned constituent elements 121, 122, 124, 125, and 126 of the memory controller 120 may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Hereinafter, the memory device 110 will be described in more detail with reference to FIG. 2.

Figure 2:
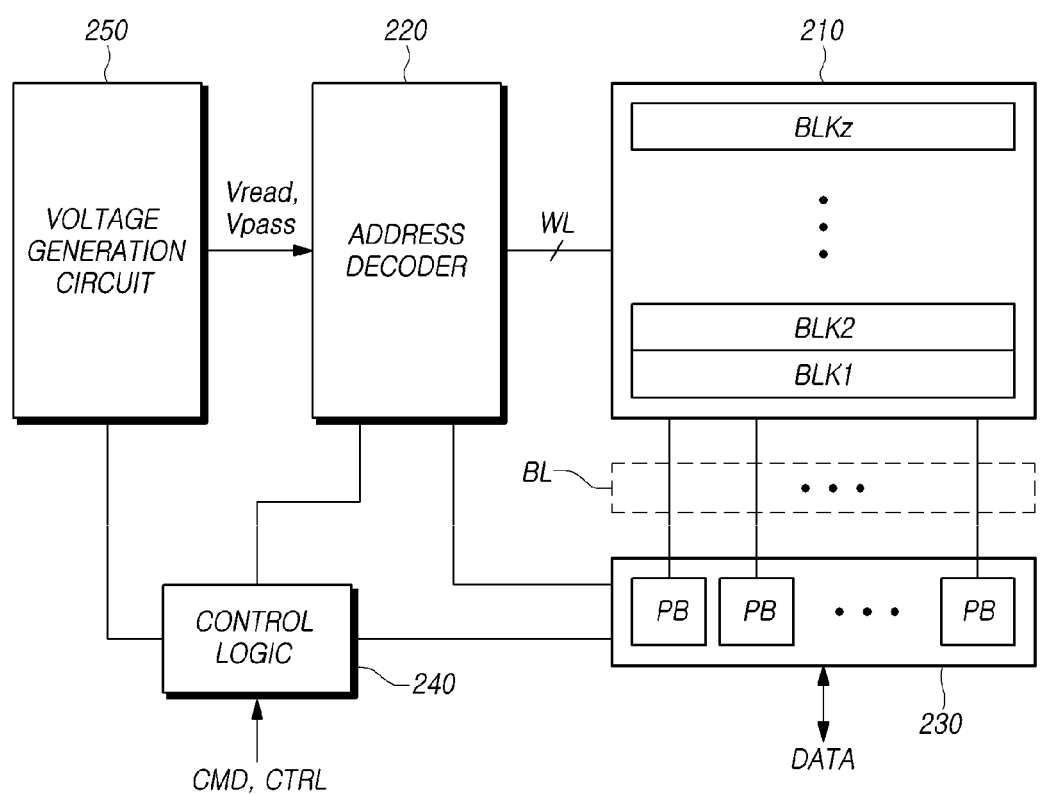
FIG. 2 is a block diagram schematically illustrating a memory device according to an exemplary embodiment of the present disclosure.

FIG. 2 is a block diagram schematically illustrating a memory device 110 based on an exemplary embodiment of the disclosed technology.

In some implementations, the memory device 110 may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be arranged in rows and columns, and multiple memory cells MC may be arranged.

The multiple memory blocks BLK1-BLKz may be coupled to the address decoder 220 through the multiple word lines WL. The multiple memory blocks BLK1-BLKz may be coupled to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure and, in some implementations, may be arranged in a three-dimensional structure.

Each of the multiple memory cells included in the memory cell array 210 may store at least one bit of data. For example, each of the multiple memory cells included in the memory cell array may be a single-level cell (SLC) configured to store one bit of data per memory cell. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data. As another example, the memory cell array 210 may include multiple memory cells that are configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be coupled to the memory cell array 210 through the multiple word lines WL.

The address decoder 220 may be configured to operate in response to commands and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 250 may apply the read voltage Vread to a selected word line WL inside a selected memory block, when applying the read voltage during a read operation, and may apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder may transmit the decoded column address to the read/write circuit 230.

The memory device 110 may perform the read operation and the program operation on a page by page basis. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that can hold data for data processing and, in some implementations, may further include a cache buffer for data caching.

The multiple page buffers PB may be coupled to the memory cell array 210 through the multiple bit lines BL. In order to detect or sense the threshold voltage Vth of the memory cells during a read operation and a program verification operation, the multiple page buffers PB may continuously supply a sensing current to the bit lines BL coupled to the memory cells to detect, at a sensing node, a change in the amount of current that flows based on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit may include a column selection circuit, in addition to the page buffers PB or page registers.

The control logic 240 may be coupled to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level at sensing nodes of multiple page buffers PB.

The control logic 240 may control the read/write circuit 230 to perform a read operation on the memory cells in the memory cell array 210. The voltage generation circuit 250 may generate a read voltage Vread and a pass voltage Vpass, which are used during the read operation, in response to a voltage generation circuit control signal provided by the control logic 240.

A memory block BLK included in the memory device 110 may consist of multiple pages PG, each of which includes a plurality of memory cells. In some implementations, the plurality of memory cells can be arranged in multiple strings. The multiple pages PG can be mapped to multiple word lines WL, and the multiple strings STR can be mapped to multiple bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other when viewed from above, thereby defining a memory array including multiple memory cells MC. Each memory cell MC may have a transistor TR arranged therein.

For example, the transistor TR arranged in each memory cell MC may include a drain, a source, and a gate. The drain (or source) of the transistor TR may be coupled to the corresponding bit line BL directly or via another transistor TR. The source (or drain) of the transistor TR may be coupled to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed on a page by page basis, and an erase operation may be performed on a memory block by memory block basis.

Figure 3:
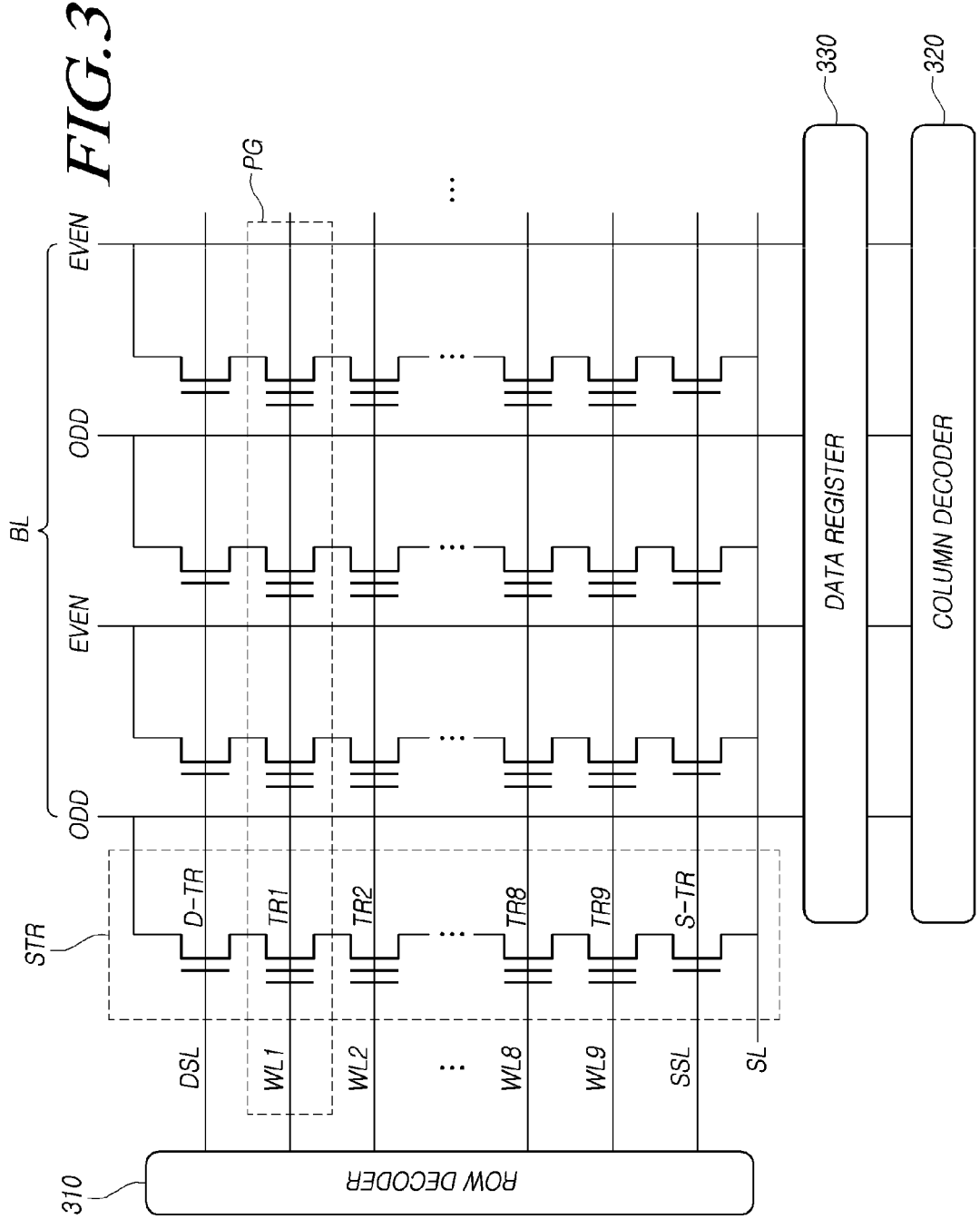
FIG. 3 is a diagram illustrating a structure of word lines and bit lines of a memory device according to an exemplary embodiment of the present disclosure.

FIG. 3 is a diagram illustrating a structure of word lines WL and bit lines BL of a memory device 110 based on an exemplary embodiment of the disclosed technology.

Referring to FIG. 3, the memory device 110 has a core area in which memory cells MC are concentrated, and an auxiliary area which corresponds to the remaining area other than the core area. The auxiliary area includes circuitry for supporting the operations of the memory cell array 210.

The core area may include pages PG and strings STR. In some implementations, multiple word lines WL1-WL9 and multiple bit lines BL are arranged to intersect when viewed from above.

The word lines WL1-WL9 may be coupled to a row decoder 310. The bit lines BL may be coupled to a column decoder 320. A data register 330, which corresponds to the read/write circuit of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in connection with conducting a program operation and a read operation, and all memory cells MC within the same page PG may perform simultaneous operations when conducting a program operation and a read operation.

The multiple bit lines BL may be coupled to the column decoder 320. In some implementations, the multiple bit lines BL may be divided into odd-numbered bit lines BL and even-numbered bit lines BL such that a pair of odd-numbered bit line BL and even-numbered bit line B are coupled in common to a column decoder 320.

The address may be used to access one or more memory cells MC in the core area. The address can be provided through the input/output end to the row decoder 310 and the column decoder 320 to select a corresponding target memory cell. In the context of this patent document, the word "target memory cell" can be used to indicate one of the memory cells MC targeted to be accessed from the memory controller or the user, and in some implementations the memory cells MC may be located at intersections between the word lines WL1-WL9 coupled to the row decoder 310 and the bit lines BL coupled to the column decoder 320.

Pages PG in a first direction (for example, X-axis direction) are coupled to a commonly used line referred to as a word line WL, and strings STR in a second direction (for example, Y-axis direction) are coupled to a common line referred to as a bit line BL. The voltage applied to a memory cell MC in the middle position or last position among memory cells MC connected in series may slightly differ from the voltage applied to the memory cell MC in the first position and from the voltage applied to the memory cell MC in the last position, due to the voltage drop across the preceding memory cell MC.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one string STR, multiple transistors TR1-TR9 may be coupled to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode coupled to the first selection line DSL, but includes no floating gate FG. The second selection transistor S-TR, which is controlled to turn on/off by the second selection line SSL, has a gate electrode coupled to the second selection line SSL, but includes no floating gate FG.

The first selection transistor D-TR is used as a switch circuit that connects the corresponding string STR to the data register 330. The second selection transistor S-TR is used as a switch circuit that connects the corresponding string STR to the source line SL. That is, the first selection transistor D-TR and the second selection transistor S-TR can be used to enable or disable the corresponding string STR.

During a program operation, the memory system 100 fills the target memory cell MC of the bit line BL which is to be programmed with electrons. Accordingly, the memory system 100 applies a predetermined turn-on voltage Vcc to the gate electrode of the first selection transistor D-TR, thereby turning on the first selection transistor D-TR, and applies a predetermined turn-off voltage (for example, 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding string STR and drain to the source line SL, which corresponds to the ground voltage, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erase operation. The memory system 100 applies a certain voltage to allow both the first selection transistor D-TR and the second selection transistor S-TR to float during an erase operation. As a result, the applied erasure voltage can remove electrical charges from the floating gate FG of the selected memory cell.

Figure 4:
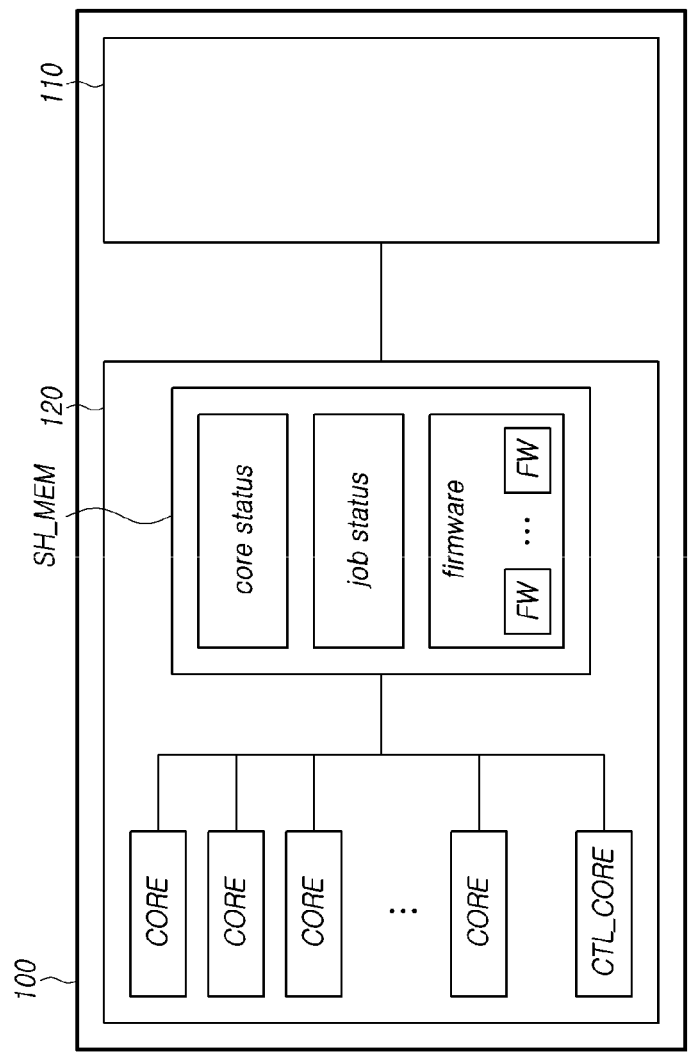
FIG. 4 is a diagram illustrating the structure of the memory system according to exemplary embodiments of the present disclosure.

FIG. 4 is a diagram illustrating the structure of the memory system 100 according to exemplary embodiments of the present disclosure.

Referring to FIG. 4, the memory controller 120 of the memory system 100 may include a plurality of cores CORE. Each of the plurality of cores CORE may execute the job or task assigned thereto, and may run a firmware for defining operations for executing the job. For example, one of the plurality of cores CORE may be a core for executing the job required to perform the function of the flash translation layer (FTL), and another one may be a core for executing jobs required to perform the function of the flash interface layer (FIL).

Meanwhile, if the processor 124 described in FIG. 1 is a multi-core processor, the plurality of cores CORE may be cores included in the processor 124. As another example, the plurality of cores CORE may be cores included in a separate multi-core processor located outside the processor 124.

In addition, the memory controller 120 may include the control core CTL_CORE. The control core CTL_CORE may monitor an event to be processed and control the plurality of cores CORE to process the event when an event occurs.

Meanwhile, similar to the plurality of cores CORE, the control core CTL_CORE may be a core included in the processor or may be a core included in the separate multi-core processor located outside the processor 124. The control core CTL_CORE may be electrically coupled to the plurality of cores CORE, and may transmit a message or signal to the plurality of cores CORE.

In addition, the memory controller 120 may include the shared memory SH_MEM. The plurality of cores CORE and the control core CTL_CORE may access the shared memory SH_MEM and exchange information through the shared memory SH_MEM. The shared memory SH_MEM may be part of the working memory 125 in FIG. 1 or may be a separate memory (e.g. SRAM, DRAM) separated from the working memory 125.

In this case, the shared memory SH_MEM may store the following information.

As an example, the shared memory SH_MEM may include state information for each of the plurality of cores CORE. For example, the state information for each core may include information on whether a corresponding core is in an idle state, information on the job executed by the corresponding core, or information on firmware run by the corresponding core.

As the other example, the shared memory SH_MEM may include state information of one or more jobs executed by the plurality of cores CORE. For example, the state information of the job may include information on whether the job is being executed or completed, and information on the execution result (e.g. success/failure) of the job.

As another example, the shared memory SH_MEM may store a plurality of firmwares FW that may be run by the plurality of cores CORE to execute any one of the jobs. In this case, each firmware may define the operations required to execute the specific job, and in order to execute the job, the core may run the firmware in which the operations required to execute the job are defined. Therefore, the jobs that the core can execute may vary depending on which firmware the core runs. In addition, the core may execute different operation by dynamically changing the firmware being executed.

In this case, the plurality of firmwares FW may be stored in the memory device 110, and the memory controller 120 may load the plurality of firmwares stored in the memory device 110 and store the loaded firmwares in the shared memory SH_MEM.

The operation of the control core CTL_CORE is described below.

Figure 5:
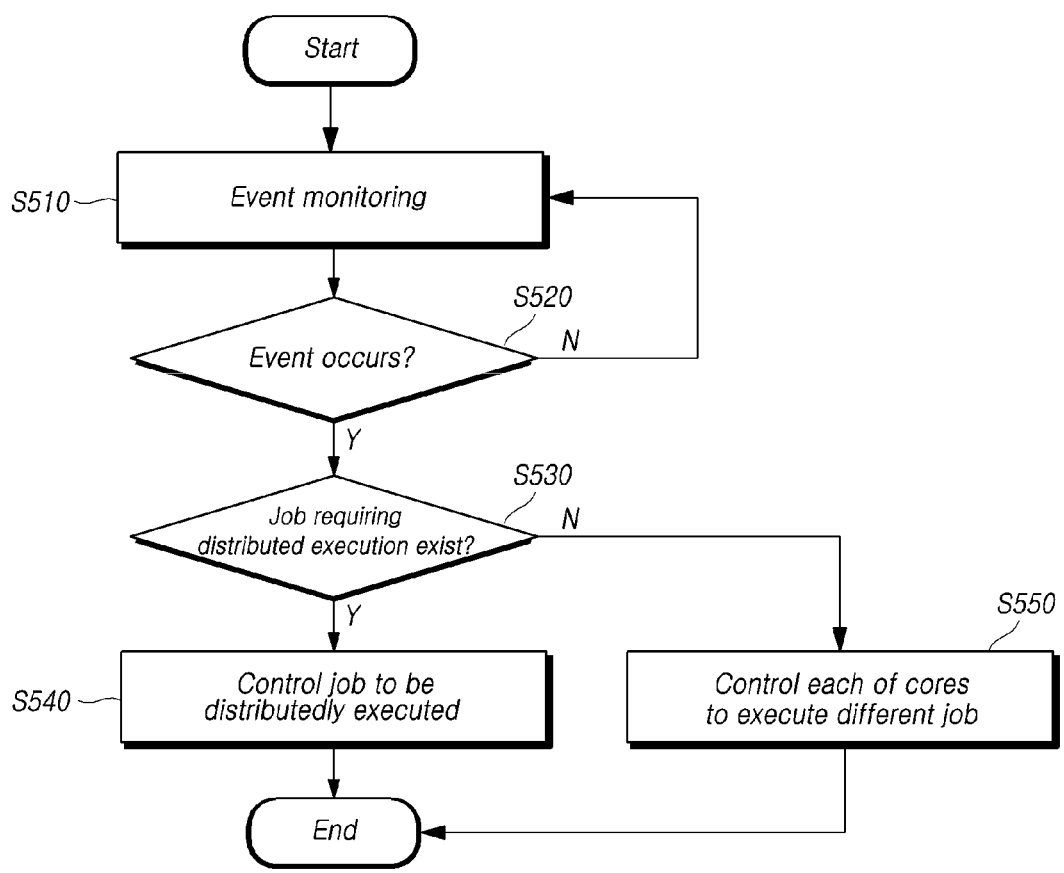
FIG. 5 is a flowchart illustrating the operation of the control core according to exemplary embodiments of the present disclosure.

FIG. 5 is a flowchart illustrating the operation of the control core CTL_CORE according to exemplary embodiments of the present disclosure.

Referring to FIG. 5, the control core CTL_CORE may monitor the event (S510). For example, the event may be a sudden power off recovery (SPOR) or a shutdown notification.

The control core CTL_CORE may check a command or signal input from the host or the external device to monitor the event.

In addition, as a result of monitoring the event, the control core CTL_CORE may determine whether the event has occurred (S520). If the event does not occur (S520-N), the control core CTL_CORE may repeat the operation of monitoring the event again.

On the other hand, if the event occurs (S520-Y), the control core CTL_CORE may determine whether the job requiring distributed execution exists among one or more jobs to be executed in order to process the event (S530).

In this case, the job requiring distributed execution may mean a job in which the job has a large overhead, and if the job is executed by only one core, the job completion time is delayed, resulting in the increase in the time required for event processing. For example, the control core CTL_CORE may select, as the job requiring distributed execution, the job whose expected execution time is equal to or greater than a set threshold time (here, the threshold time value may vary depending on the event).

Meanwhile, the job requiring distributed execution may be referred to as a burst job, a critical job, and the like, and the meaning is not limited by the terms.

If there is the job requiring distributed execution (S530-Y), the control core CTL_CORE may control the job to be distributedly executed (S540). On the other hand, if the job requiring distributed execution does not exist (S530-N), the control core CTL_CORE may control each of the plurality of cores CORE to execute different jobs one by one (S550).

As described above, the control core CTL_CORE may control the distributed execution of job requiring distributed execution, thereby improving the response speed to the host by reducing the time required to execute the corresponding job and by preventing the problem of delaying event processing.

Hereinafter, a description is provided regarding the operation of controlling the job requiring distributed execution by the control core CTL_CORE to be distributed execution. Hereinafter, the job requiring distributed execution is referred to as a target job.

Figure 6:
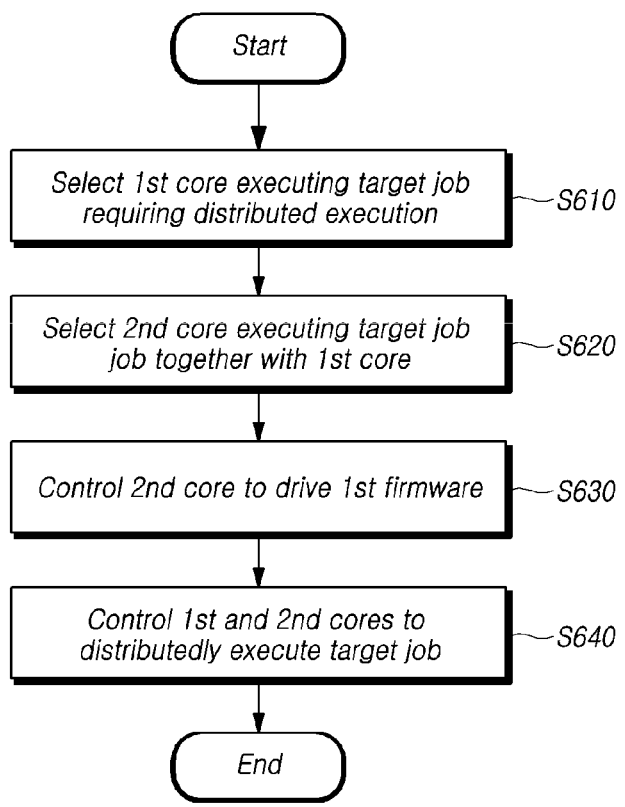
FIG. 6 is a flowchart illustrating the controlling operation of the control core to perform distributed execution of the target job according to exemplary embodiments of the present disclosure.

FIG. 6 is a flowchart illustrating the controlling operation of the control core CTL_CORE to perform distributed execution of the target job according to exemplary embodiments of the present disclosure.

First, the control core CTL_CORE may select the first core that executes the target job from among the plurality of cores CORE (S610). In this case, the first core may be selected based on state information of the plurality of cores CORE stored in the shared memory SH_MEM and state information of jobs. In addition, the first core may run the first firmware among the plurality of firmwares stored in the shared memory SH_MEM in order to execute the target job.

In addition, the control core CTL_CORE may select the second core to execute the target job together with the first core from among the plurality of cores CORE (S620).

The control core CTL_CORE may control the second core to run the first firmware (S630). Since the first core runs the first firmware to execute the target job, the second core is required to run the first firmware in the same way as the first core in order to execute the target job together with the first core.

In addition, the control core CTL_CORE may control the first core and the second core to perform distributed execution of the target job (S640).

Hereinafter, it will be described an example of the operation in which the control core CTL_CORE selects the first core in step S610.

Figure 7:
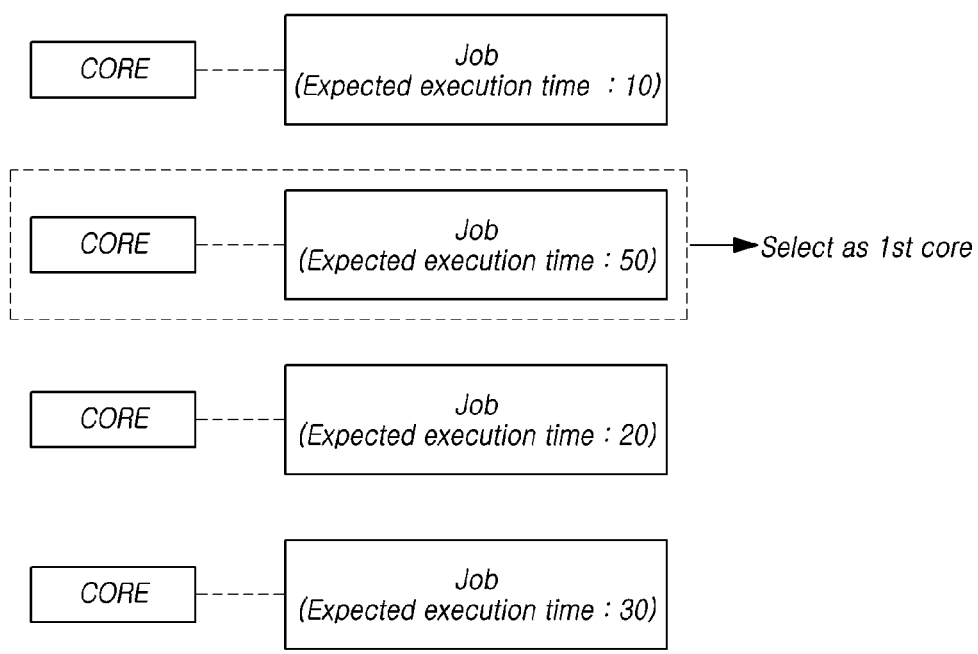
FIG. 7 is a diagram illustrating an example in which the control core selects the first core according to exemplary embodiments of the present disclosure.

FIG. 7 is a diagram illustrating an example in which the control core CTL_CORE selects the first core according to exemplary embodiments of the present disclosure.

Referring to FIG. 7, the control core CTL_CORE may select a core having the longest expected execution time of the job from among the plurality of cores CORE as the first core. In this case, the control core CTL_CORE may identify the expected execution time of the job based on the state information of the job stored in the shared memory SH_MEM.

In FIG. 7, it is assumed that there are four cores, and the expected execution time of the job executed by each core is 10, 50, 20, and 30, respectively. In this case, the control core CTL_CORE may select the core executing the job having the expected execution time of 50 as the first core. This is because the longer the expected execution time, the higher the possibility of becoming a bottleneck that increases the time required for event processing.

Meanwhile, the control core CTL_CORE may select the first core according to other criteria in addition to the expected execution time of the job executed by each core. For example, when priority is designated for each job, the control core CTL_CORE may select a core executing the job with the highest priority as the first core.

Hereinafter, it will be described an example of the operation in which the control core CTL_CORE selects the second core in step S620.

Figure 8:
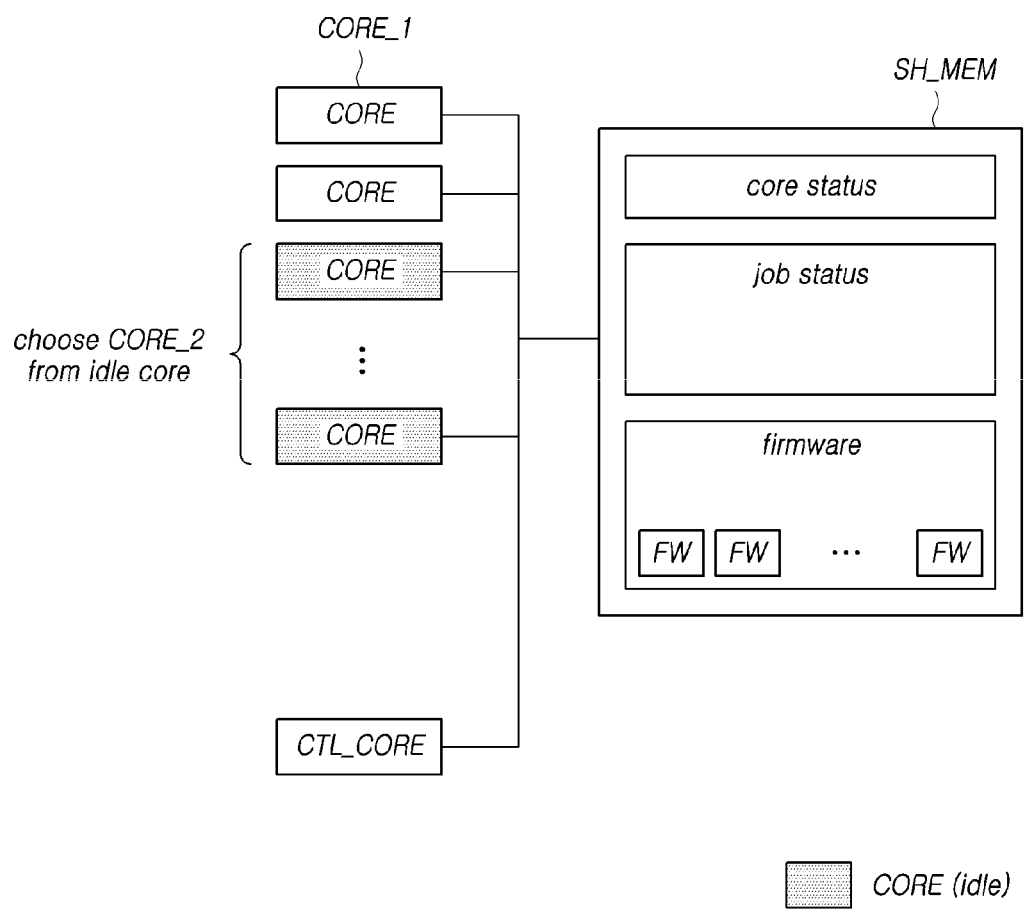
FIG. 8 is a diagram illustrating an example in which the control core selects the second core according to exemplary embodiments of the present disclosure.

FIG. 8 is a diagram illustrating an example in which the control core CTL_CORE selects the second core according to exemplary embodiments of the present disclosure.

Referring to FIG. 8, the control core CTL_CORE may select the second core CORE_2 from a core in an idle state among a plurality of cores CORE. The core in the idle state may refer to a core that does not execute a specific job.

The reason the control core CTL_CORE selects the second core CORE_2 from the core in the idle state is as follows. This is because if the core that is not in the idle state is selected as the second core CORE_2, there may be problem of delaying of the time point at which the job being executed by the corresponding core is completed.

Figure 9:
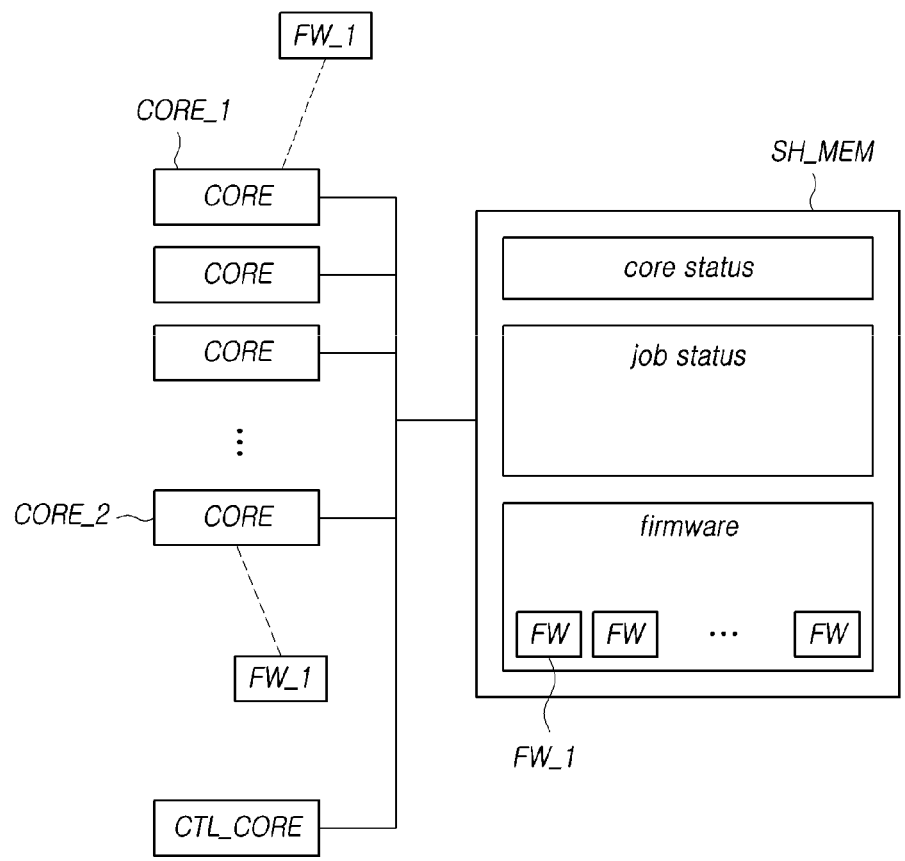
FIG. 9 is a diagram illustrating firmware run by the first core and the second core according to exemplary embodiments of the present disclosure.

FIG. 9 is a diagram illustrating firmware FW run by the first core CORE_1 and the second core CORE_2 according to exemplary embodiments of the present disclosure.

Referring to FIG. 9, among the plurality of cores CORE, both the first core CORE_1 and the second core CORE_2 may run the first firmware FW_1 among the firmware FW stored in the shared memory SH_MEM. The first core CORE_1 and the second core CORE_2 may run the first firmware FW_1 to execute the target job TGT_JOB.

As described above, both of the first core CORE_1 and the second core CORE_2 may run the first firmware FW_1 to execute the target job. However, in order for the first core CORE_1 and the second core CORE_2 to distributedly execute the target job, it is required the process of dividing the target job.

Figure 10:
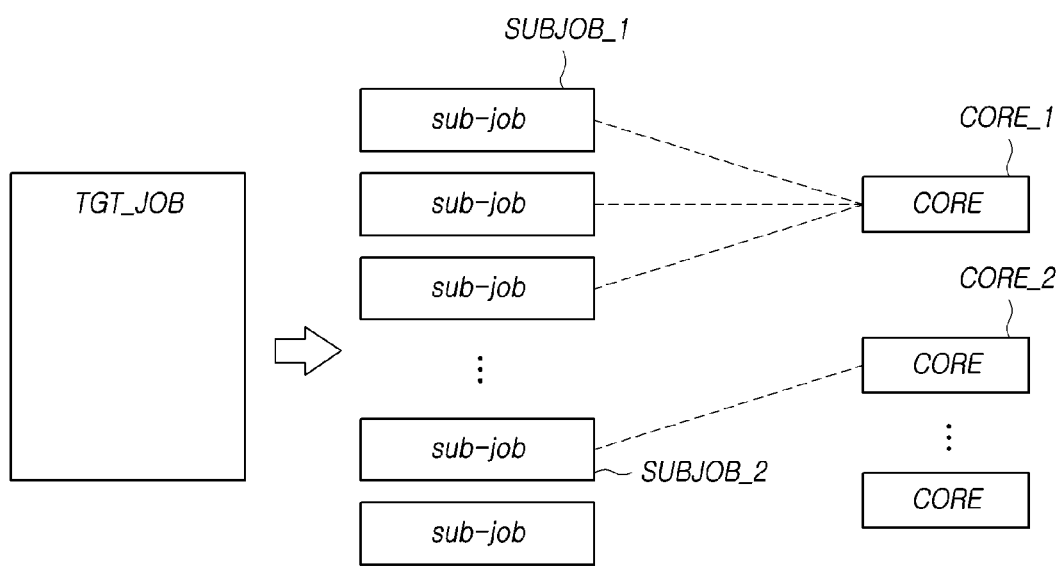
FIG. 10 is a diagram illustrating the operation of dividing the target job into a plurality of sub-jobs by the first core according to exemplary embodiments of the present disclosure.

FIG. 10 is a diagram illustrating the operation of dividing the target job TGT_JOB into a plurality of sub-jobs by the first core CORE_1 according to exemplary embodiments of the present disclosure.

Referring to FIG. 10, the first core CORE_1 may divide the target job TGT_JOB into a plurality of sub-jobs in order to perform distributed execution of the target job TGT_JOB.

In this case, each of the plurality of sub-jobs may be independently processed in different cores. That is, the first core CORE_1 may divide the target job TGT_JOB so that the cores for distributedly executing the target job TGT_JOB to execute sub-jobs independently of each other.

In addition, the cores CORE performing distributed execution of the target job TGT_JOB may execute one or more of the plurality of sub-jobs divided by the first core CORE_1. The first core CORE_1 and the second core CORE_2 described above in FIG. 9 may execute one or more of the plurality of sub-jobs. Hereinafter, one of the sub-jobs executed by the first core CORE_1 is referred to as the first sub-job SUBJOB_1, and one of the sub-jobs executed by the second core CORE_2 is referred to the second sub-job (SUBJOB_2).

Meanwhile, the core executing one or more of the plurality of sub-jobs is not limited to the first core CORE_1 and the second core CORE_2. That is, cores other than the first core CORE_1 and the second core CORE_2 may also participate in the distributed execution of the target job TGT_JOB.

Figure 11:
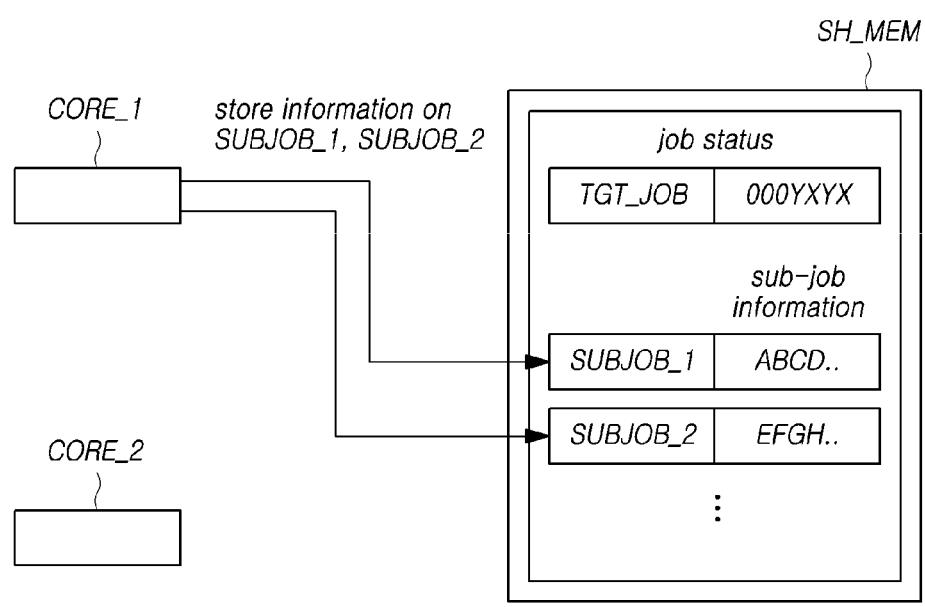
FIG. 11 is a diagram illustrating the operation of storing information on the sub-job in the shared memory by the first core according to exemplary embodiments of the present disclosure.

FIG. 11 is a diagram illustrating the operation of storing information on the sub-job in the shared memory SH_MEM by the first core CORE_1 according to exemplary embodiments of the present disclosure.

Referring to FIG. 11, the first core CORE_1 may store the information of the first sub-job SUBJOB_1 to be processed by the first core CORE_1 among the plurality of sub-jobs and the information of the second sub-job SUBJOB_2 to be processed by the second core CORE_2 in the shared memory SH_MEM. Therefore, the first core CORE_1 may request the second core CORE_2 to execute the second sub-job SUBJOB_2.

Since the information stored in the shared memory SH_MEM can be accessed by all cores, the second core CORE_2 may access the shared memory SH_MEM to identify that the second sub-job SUBJOB_2 has been assigned to the second core.

Figure 12:
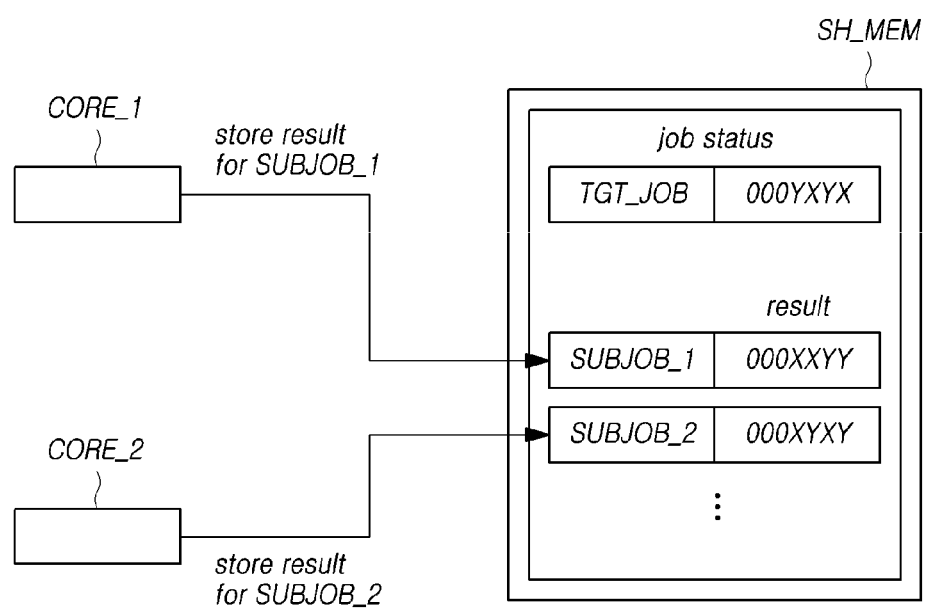
FIG. 12 is a diagram illustrating the operation of storing execution result of the sub-job in the shared memory by the first core and the second core according to exemplary embodiments of the present disclosure.

FIG. 12 is a diagram illustrating the operation of storing execution result of the sub-job in the shared memory SH_MEME by the first core CORE_1 and the second core CORE_2 according to exemplary embodiments of the present disclosure.

Referring to FIG. 12, the first core CORE_1 may store the execution result in the shared memory SH_MEM after executing the first sub-job SUBJOB_1.

Similarly, the second core CORE_2 may execute the second sub-job SUBJOB_2 and then store the execution result in the shared memory SH_MEM.

The reason each core executing the sub-job stores the execution result in the shared memory SH_MEM is for the control core CTL_CORE to access the shared memory SH_MEM so as to check whether the target job execution has been completed. If all sub-jobs corresponding to the target job are completely executed, the control core CTL_CORE may determine that the execution of the target job has been completed.

Figure 13:
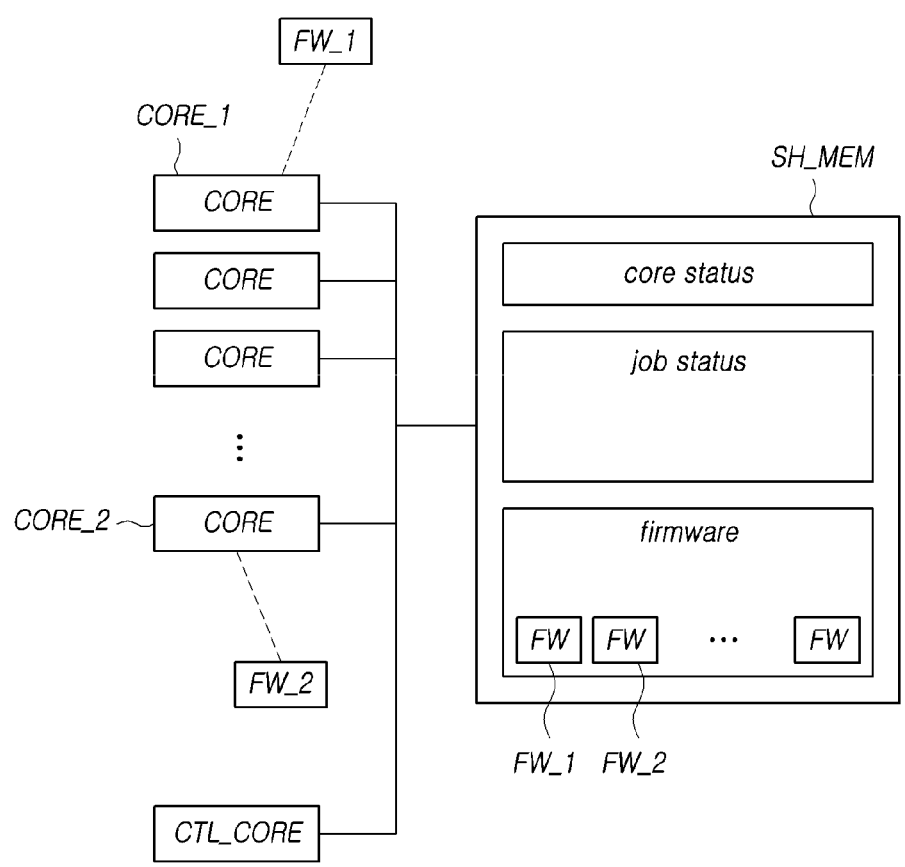
FIG. 13 is a diagram illustrating firmware run by the first core and the second core after the execution of the target job is completed according to exemplary embodiments of the present disclosure.

FIG. 13 is a diagram illustrating firmware run by the first core CORE_1 and the second core CORE_2 after the execution of the target job is completed according to exemplary embodiments of the present disclosure.

Referring to FIG. 13, the control core CTL_CORE may control the second core CORE_2 to run the second firmware FW_2 from among the plurality of firmwares FW stored in the shared memory SH_MEM after the target job is completely executed. In this case, the second firmware FW_2 may be a firmware that has already been run before the second core CORE_2 runs the first firmware FW_1 to execute the target job.

Since the execution of the target job has been completed, the second core CORE_2 no longer needs to run the first firmware FW_1 which has been run to execute the target job. Therefore, in order to allow the second core CORE_2 to execute a different job, the control core CTL_CORE may control the second core CORE_2 to run the second firmware FW_2.

Hereinafter, in an example in which the event is the sudden power off recovery (SPOR), the contents of FIGS. 4 to 13 will be described.

When the memory system 100 is booted after SPO (Sudden Power Off), the control core CTL_CORE may recognize that the SPOR event has occurred. In this case, the control core CTL_CORE may select a core executing the job, e.g., L2P (logical to physical) map table rebuild, having the longest expected execution time among jobs to be executed as the first core CORE_1.

As an example, it is assumed that the first core CORE_1 is a core that performs the flash translation layer (FTL) operation.

In addition, the control core CTL_CORE may check whether there is an idle core among other cores other than the first core CORE_1 based on the state information of each core stored in the shared memory SH_MEM, and may select one of the idle cores as the second core CORE_2. For example, it is assumed that the second core CORE_2 is a core that executes the host interface layer (HIL) operation.

In this case, the control core CTL_CORE may control the second core CORE_2 to run the firmware in which the flash translation layer FTL operation is defined.

In addition, the first core CORE_1 may, when the SPOR event occurs, divide the job to be executed by the first core CORE_1 into the plurality of sub-jobs, and may store information on the sub-job to be executed by the second core CORE_2 among the divided sub-jobs in the shared memory SH_MEM.

The second core CORE_2 may access the shared memory SH_MEM to check information on the sub-job to be executed, and then execute the corresponding sub-job. In addition, the second core CORE_2 may store the execution result of the sub-job in the shared memory SH_MEM.

The control core CTL_CORE may access the shared memory SH_MEM to check the execution results of the divided plurality of sub-jobs. In addition, the control core CTL_CORE may control the second core CORE_2 to run the firmware defining the host interface layer HIL operation in order for the second core CORE_2 to execute the host interface layer HIL operation again.

Figure 14:
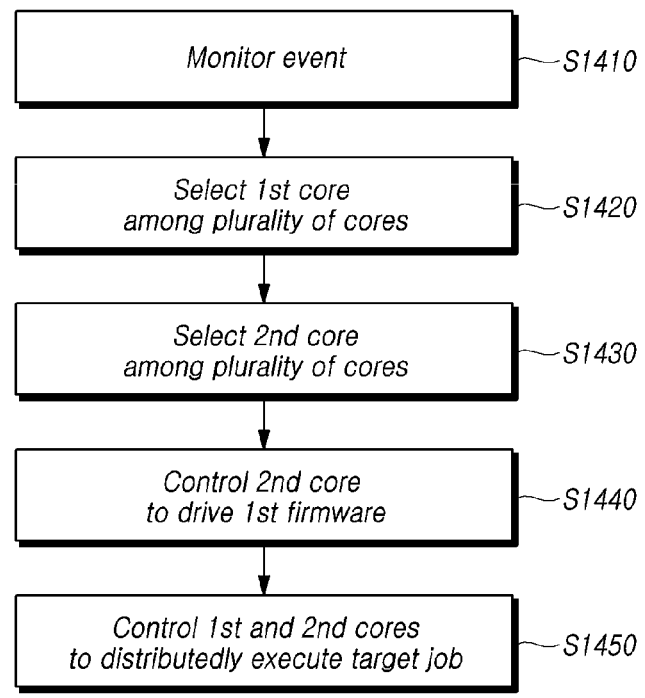
FIG. 14 is a diagram illustrating the method of operating the memory system according to exemplary embodiments of the present disclosure.

FIG. 14 is a diagram illustrating the method of operating the memory system 100 according to exemplary embodiments of the present disclosure.

The method of operating the memory system 100 may include monitoring the event to be processed using the plurality of cores (CORE) (S1410).

The method of operating the memory system 100 may include, when an event to be monitored occurs, selecting the first core CORE_1 from among the plurality of cores CORE (S1420). In this case, the first core CORE_1 may be a core for executing the target job which is a job to be distributedly executed among jobs executed to process the event. The first core CORE_1 may be determined based on state information of the plurality of cores CORE and state information of jobs. In addition, the first core CORE_1 may run the first firmware FW_1 among the plurality of firmwares FW in order to execute the target job.

As an example, the first core CORE_1 may be a core having the longest expected execution time of the job to be executed, among the plurality of cores CORE.

The method of operating the memory system 100 may include selecting the second core CORE_2 to execute the target job together with the first core CORE_1 from among the plurality of cores CORE (S1430).

As an example, the second core CORE_2 may be selected from cores in the idle state among the plurality of cores CORE.

The method of operating the memory system 100 may include controlling the second core CORE_2 selected in step S1430 to run the first firmware FW_1 (S1440).

The method of operating the memory system 100 may include controlling the first core CORE_1 and the second core CORE_2 to perform distributed execution of the target job (S1450). In this case, the target job may be divided into the plurality of sub-jobs which can be independently processed by different cores.

Meanwhile, the operating method of the memory system 100 may further include controlling the second core CORE_2 to run the second firmware FW_2 among the plurality of firmwares FW after the execution of the target job is completed.

In some implementations, the operation of the memory controller 120 described above may be controlled by the control circuit 123, and may be performed in such a manner that the processor 124 executes (runs) firmware in which the overall operation of the memory controller 120 is programmed.

Figure 15:
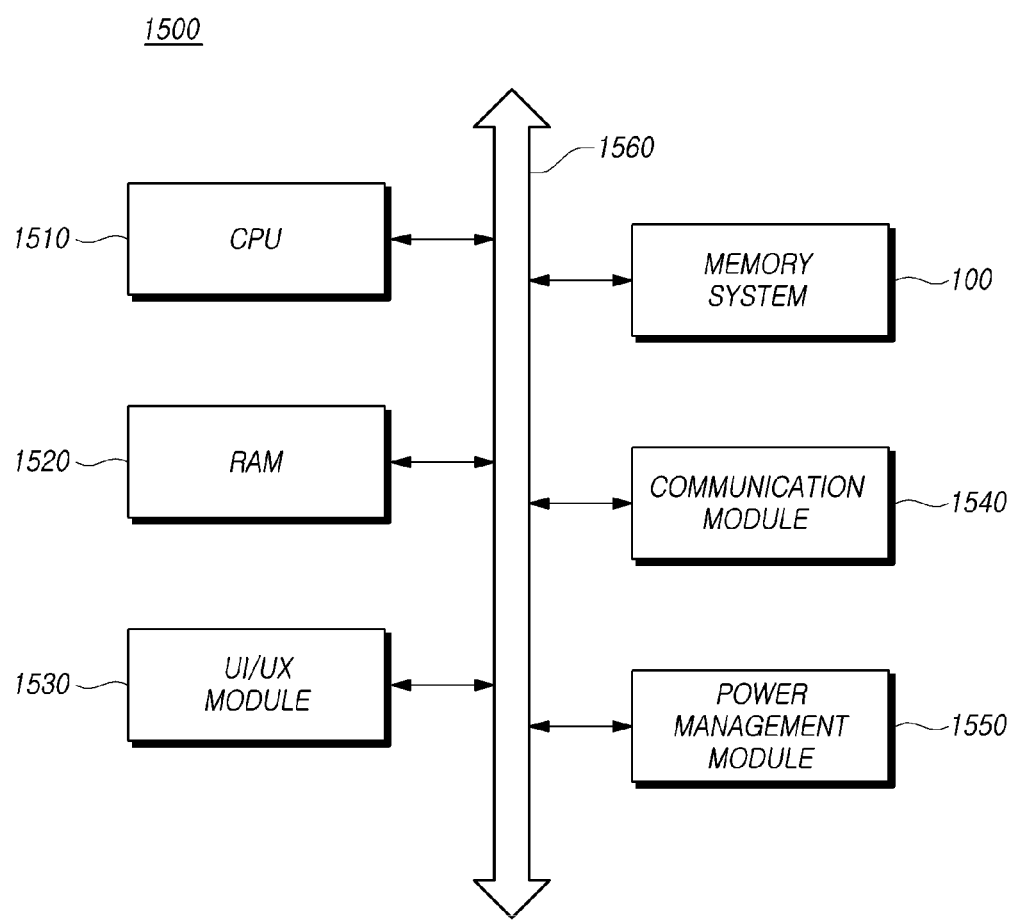
FIG. 15 is a diagram illustrating the configuration of a computing system based on exemplary embodiments of the disclosed technology.

FIG. 15 is a diagram illustrating the configuration of a computing system 1500 based on an exemplary embodiment of the disclosed technology.

Referring to FIG. 15, the computing system 1500 based on an embodiment of the disclosed technology may include: a memory system 100 described above electrically coupled to a system bus 1560; a CPU 1510 configured to control the overall operation of the computing system 1500; a RAM 1520 configured to store data and information related to operations of the computing system 1500; a user interface/user experience (UI/UX) module configured to provide the user with a user environment; a communication module 1540 configured to communicate with an external device as a wired and/or wireless type; and a power management module 1550 configured to manage power used by the computing system 1500.

The computing system 1500 may be a personal computer (PC) or may include a mobile terminal such as a smartphone, a tablet or various electronic devices.

The computing system 1500 may further include a battery for supplying an operating voltage, and may further include an application chipset, a graphic-related module, a camera image processor, and a DRAM. Other elements would be obvious to a person skilled in the art.

The memory system 100 described above may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

According to the embodiments of the disclosed technology described above, the operation delay time of the memory system may be reduced or minimized. In addition, the disclosed technology can be implemented in a way that reduces or minimizes an overhead occurring in the process of calling a specific function. Although various embodiments of the disclosed technology have been described for illustrative purposes, those skilled in the art will appreciate that various modifications, additions and substitutions are possible based on what is described and illustrated in this patent document.

What is claimed is:
1. A memory system comprising:
a memory device; and
a memory controller for communicating with the memory device and controlling the memory device,
wherein the memory controller comprises:
a plurality of cores;
a control core for monitoring an event to be processed using the plurality of cores, and controlling the plurality of cores to process the event; and a shared memory for storing state information of the plurality of cores, state information of one or more jobs executed by the plurality of cores to process the event, and a plurality of firmwares run by the plurality of cores to execute any one of the jobs, wherein the control core, when processing the event, selects a first core executing a target job requiring distributed execution among the plurality of cores, wherein the first core runs a first firmware among the plurality of firmwares to execute the target job, based on the state information of the plurality of cores and state information of jobs, selects a second core among the plurality of cores to execute a part of the target job together with the first core, controls the second core to run the first firmware, and controls the first core and the second core to perform distributed execution of the target job, and wherein the event is a sudden power off recovery.

2. The memory system of claim 1, wherein the control core selects, as the first core, a core having the longest expected execution time of the job to be executed among the plurality of cores.

3. The memory system of claim 1, wherein the control core selects a core in an idle state among the plurality of cores as the second core.

4. The memory system of claim 1, wherein the first core divides the target job into a plurality of sub-jobs independently executable in different cores.

5. The memory system of claim 4, wherein the first core stores information of a first sub job to be executed by the first core among the plurality of sub jobs and information of a second sub job to be executed by the second core in the shared memory.

6. The memory system of claim 5, wherein the second core executes the second sub job based on the information of the second sub job stored in the shared memory, and stores execution result of the second sub-job in the shared memory.

7. The memory system of claim 1, wherein the control core controls the second core to run a second firmware among the plurality of firmwares after execution of the target job is completed.

8. An operating method of a memory system comprising:
monitoring an event to be processed using a plurality of cores;
selecting, when processing the event, a first core executing a target job requiring distributed execution among one or more jobs executed to process the event among the plurality of cores based on state information of the plurality of cores and state information of jobs, wherein the first core runs a first firmware among a plurality of firmwares run by the plurality of cores to execute any one of the jobs;
selecting a second core among the plurality of cores to execute a part of the target job together with the first core;
controlling the second core to run the first firmware; and
controlling the first core and the second core to perform distributed execution of the target job,
wherein the event is a sudden power off recovery.

9. The operating method of claim 8, wherein the first core is a core having the longest expected execution time of the job to be executed from among the plurality of cores.

10. The operating method of claim 8, wherein the second core is a core in an idle state among the plurality of cores.

11. The operating method of claim 8, wherein controlling to perform distributed execution of the target job comprises dividing the target job into a plurality of sub jobs independently executable in different cores.

12. The operating method of claim 11, further comprising the first core storing information of a first sub job to be executed by the first core among the plurality of sub-jobs and information of a second sub job to be executed by the second core in a shared memory.

13. The operating method of claim 12, further comprising the second core executing the second sub-job based on the information of the second sub-job stored in the shared memory, and storing execution result of the second sub-job in the shared memory.

14. The operating method of claim 8, further comprising controlling the second core to run a second firmware among the plurality of firmwares after execution of the target job is completed.

* * * * *